United States Patent
Chung et al.

(10) Patent No.: US 9,413,012 B2
(45) Date of Patent: Aug. 9, 2016

(54) BINDER FOR RECHARGEABLE LITHIUM BATTERY, ELECTRODE FOR RECHARGEABLE LITHIUM BATTERY, METHOD OF PREPARING ELECTRODE FOR RECHARGEABLE LITHIUM BATTERY AND RECHARGEABLE LITHIUM BATTERY INCLUDING ELECTRODE

(71) Applicants: SAMSUNG SDI CO., LTD., Yongin-si, Gyeonggi-do (KR); AEKYUNG CHEMICAL CO., LTD., Seoul (KR)

(72) Inventors: Byung-Joo Chung, Yongin-si (KR); Eon-Mi Lee, Yongin-si (KR); Nam-Seon Kim, Daejeon-si (KR); Yang-Soo Kim, Daejeon-si (KR); Kwang-Sik Choi, Daejeon-si (KR)

(73) Assignee: Aekyung Chemical Co., Ltd., Seoul (KR)

( * ) Notice: Subject to any disclaimer, the term of this patent is extended or adjusted under 35 U.S.C. 154(b) by 390 days.

(21) Appl. No.: 14/152,943

(22) Filed: Jan. 10, 2014

(65) Prior Publication Data

US 2014/0205899 A1    Jul. 24, 2014

(30) Foreign Application Priority Data

Jan. 21, 2013 (KR) .................. 10-2013-0006660

(51) Int. Cl.
| | |
|---|---|
| H01M 4/62 | (2006.01) |
| H01M 4/1395 | (2010.01) |
| H01M 4/1391 | (2010.01) |
| H01M 4/04 | (2006.01) |
| H01M 4/1393 | (2010.01) |
| H01M 4/133 | (2010.01) |
| H01M 4/134 | (2010.01) |

(52) U.S. Cl.
CPC ............ *H01M 4/622* (2013.01); *H01M 4/0404* (2013.01); *H01M 4/133* (2013.01); *H01M 4/134* (2013.01); *H01M 4/1393* (2013.01); *H01M 4/1395* (2013.01); *Y02E 60/122* (2013.01)

(58) Field of Classification Search
CPC ... H01M 4/0404; H01M 4/133; H01M 4/134; H01M 4/1393; H01M 4/1395; H01M 4/622; Y02E 60/122

USPC ................. 429/211; 427/58, 122, 123, 125; 524/533; 525/296

See application file for complete search history.

(56) References Cited

U.S. PATENT DOCUMENTS

| | | | | |
|---|---|---|---|---|
| 2,821,521 | A * | 1/1958 | Price ...................... | C08F 22/36 526/251 |
| 2006/0014856 | A1 * | 1/2006 | McGorrin ............ | C09D 11/326 523/160 |
| 2008/0187838 | A1 | 8/2008 | Le | |
| 2011/0117431 | A1 | 5/2011 | Fukui et al. | |
| 2011/0311871 | A1 | 12/2011 | Fukui et al. | |
| 2014/0212728 | A1 * | 7/2014 | Kaneda ................. | H01M 2/162 429/144 |

FOREIGN PATENT DOCUMENTS

| | | |
|---|---|---|
| JP | 2011-204592 A | 10/2011 |
| JP | 2012-003918 A | 1/2012 |
| KR | 10-2011-0021680 A | 3/2011 |

* cited by examiner

*Primary Examiner* — Ling Choi
*Assistant Examiner* — Chun-Cheung Wang
(74) *Attorney, Agent, or Firm* — Lewis Roca Rothgerber Christie LLP

(57) ABSTRACT

A binder for a rechargeable lithium battery includes a copolymer having a weight average molecular weight of about 10,000 to about 500,000 and including a repeating unit represented by Chemical Formula X and a repeating unit represented by Chemical Formula Y-1:

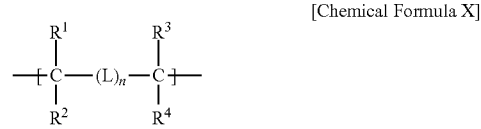

[Chemical Formula X]

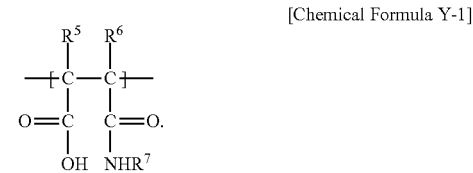

[Chemical Formula Y-1]

The binder may be used in preparing an electrode for a rechargeable lithium battery and a rechargeable lithium battery including the electrode exhibits improved stability, rate capability, and cycle-life.

7 Claims, 2 Drawing Sheets

BINDER FOR RECHARGEABLE LITHIUM BATTERY, ELECTRODE FOR RECHARGEABLE LITHIUM BATTERY, METHOD OF PREPARING ELECTRODE FOR RECHARGEABLE LITHIUM BATTERY AND RECHARGEABLE LITHIUM BATTERY INCLUDING ELECTRODE

CROSS-REFERENCE TO RELATED APPLICATION

This application claims priority to and the benefit of Korean Patent Application No. 10-2013-0006660 filed in the Korean Intellectual Property Office on Jan. 21, 2013, the entire content of which is incorporated herein by reference.

BACKGROUND

1. Field

A binder for a rechargeable lithium battery, an electrode for a rechargeable lithium battery, a method of preparing the electrode for the rechargeable lithium battery, and a rechargeable lithium battery including the electrode are disclosed.

2. Description of the Related Art

A rechargeable lithium battery includes positive and negative electrodes including a material that can reversibly intercalate/deintercalate lithium ions as positive and negative active materials and an organic electrolyte solution or a polymer electrolyte solution charged between the positive and negative electrodes. Herein, the positive and negative electrodes intercalate and deintercalate lithium ions and produce electrical energy through oxidation and reduction reactions.

As for a positive active material for a lithium rechargeable battery, a lithium-transition metal oxide being capable of intercalating and deintercalating lithium, such as $LiCoO_2$, $LiMn_2O_4$, $LiNi_{1-x}Co_xO_2$ ($0<x<1$), and the like, has been used.

As for a negative active material for a lithium rechargeable battery, various carbon-based materials such as artificial graphite, natural graphite, and hard carbon capable of intercalating and deintercalating lithium ions have been used. Recently, demand of a battery having high energy density has increasingly required a negative active material having high theoretical capacity density. Accordingly, Si, Sn, and Ge alloyed with lithium and an oxide thereof and an alloy thereof have drawn attention. In particular, a Si-based negative active material has very high charge capacity and is widely applied to a high-capacity battery. However, the Si-based negative active material may expand by about 300% to about 400% during charge and discharge. Accordingly, research on a binder capable of effectively suppressing expansion of the Si-based negative active material and/or being more durable with respect to the expansion, is actively performed.

SUMMARY

Aspects of embodiments of the present invention are directed to providing a binder for a rechargeable lithium battery which allows active material particles to adhere well to one another and allows the active material to adhere well to a current collector.

Aspects of embodiments of the present invention are also directed to providing a binder for a rechargeable lithium battery, which suppresses expansion of an active material and/or is durable with respect to the expansion of an active material.

Aspects of embodiments of the present invention are also directed to providing an electrode for a rechargeable lithium battery having good stability, rate capability, and cycle-life characteristics.

Aspects of embodiments of the present invention are also directed to providing a method of manufacturing the electrode for a rechargeable lithium battery having good stability, rate capability, and cycle-life characteristics.

Aspects of embodiments of the present invention are also directed to providing a rechargeable lithium battery having good stability, rate capability, and cycle-life characteristics.

According to an embodiment of the present invention, a binder for a rechargeable lithium battery is provided. The binder for a rechargeable lithium battery includes a copolymer including a repeating unit represented by Chemical Formula X and a repeating unit represented by Chemical Formula Y-1, and having a weight average molecular weight of about 10,000 to about 500,000:

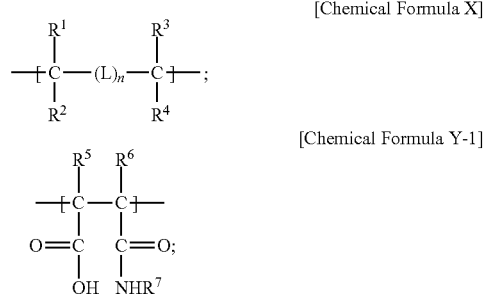

wherein in Chemical Formula X: $R^1$ to $R^4$ are each independently selected from hydrogen, a substituted or unsubstituted C1 to C20 alkyl group, and a substituted or unsubstituted C6 to C30 aryl group, L is a substituted or unsubstituted C2 to C10 alkenylene group, and n is 0 or 1, and wherein in Chemical Formula Y-1: $R^5$ and $R^6$ are each independently selected from hydrogen and a substituted or unsubstituted C1 to C20 alkyl group, and $R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

In one embodiment, the binder for a rechargeable lithium battery includes the repeating unit represented by Chemical Formula X and the repeating unit represented by Chemical Formula Y-1 in a mole ratio of about 40:60 to about 60:40.

In one embodiment, the binder for a rechargeable lithium battery is aqueous.

In one embodiment, in the binder for a rechargeable lithium battery, the copolymer further includes a repeating unit represented by Chemical Formula Z:

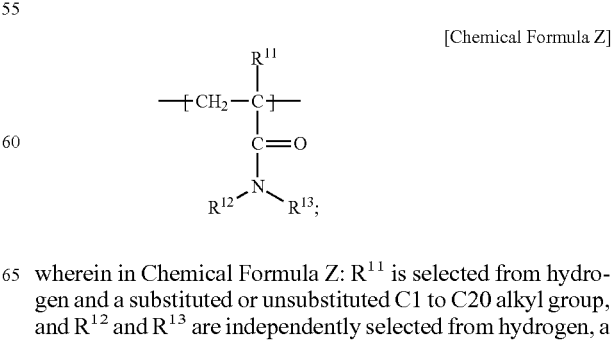

wherein in Chemical Formula Z: $R^{11}$ is selected from hydrogen and a substituted or unsubstituted C1 to C20 alkyl group, and $R^{12}$ and $R^{13}$ are independently selected from hydrogen, a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

In one embodiment, the binder for a rechargeable lithium battery includes about 5 mol % to about 35 mol % of the repeating unit represented by Chemical Formula X, about 5 mol % to about 35 mol % of the repeating unit represented by Chemical Formula Y-1, and about 30 mol % to about 90 mol % of the repeating unit represented by Chemical Formula Z.

In one embodiment, in the binder for a rechargeable lithium battery, the copolymer further includes repeating units represented by at least one of the following Chemical Formulas W-1 to W-5:

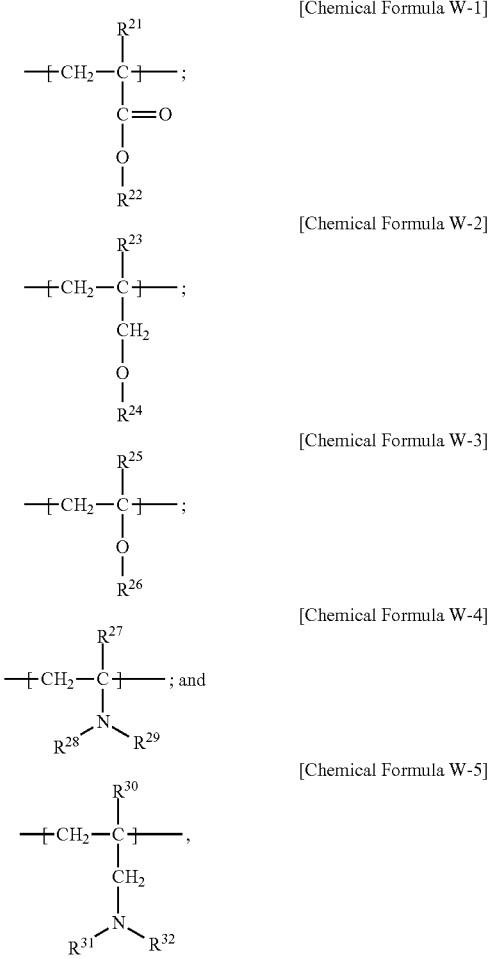

[Chemical Formula W-1]

[Chemical Formula W-2]

[Chemical Formula W-3]

[Chemical Formula W-4]

[Chemical Formula W-5]

wherein: $R^{21}$, $R^{23}$, $R^{25}$, $R^{27}$, and $R^{30}$ are each independently selected from hydrogen and a substituted or unsubstituted C1 to C20 alkyl group; $R^{22}$, $R^{24}$, and $R^{26}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, a C1 to C20 alkylamine group, a C1 to C20 alkyl group substituted with an alkoxysilane group, and a C1 to C20 alkyl group substituted with an amine group; $R^{28}$ and $R^{29}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group; $R^{28}$ and $R^{29}$ are each linear or are linked as a fused ring; $R^{31}$ and $R^{32}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group; and $R^{31}$ and $R^{32}$ are each linear or are linked as a fused ring.

In one embodiment, in the binder for a rechargeable lithium battery, the copolymer includes about 5 mol % to about 35 mol % of the repeating unit represented by Chemical Formula X, about 5 mol % to about 35 mol % of the repeating unit represented by Chemical Formula Y-1, about 20 mol % to about 89 mol % of the repeating unit represented by Chemical Formula Z, and about 1 mol % to about 10 mol % of at least one of repeating units represented by Chemical Formulas W-1 to W-5.

In another embodiment, an electrode for a rechargeable lithium battery is provided. The electrode includes a current collector and an active material layer on one side or both sides of the current collector, wherein: the active material layer includes an active material and a binder, the binder includes a copolymer having a weight average molecular weight of about 10,000 to about 500,000, and the copolymer includes a repeating unit represented by Chemical Formula X:

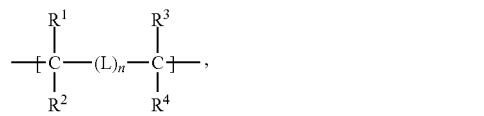

[Chemical Formula X]

wherein, in Chemical Formula X: $R^1$ to $R^4$ are each independently selected from hydrogen, a substituted or unsubstituted C1 to C20 alkyl group, and a substituted or unsubstituted C6 to C30 aryl group, L is a substituted or unsubstituted C2 to C10 alkenylene group, and n is 0 or 1, and wherein the copolymer comprises a repeating unit represented by Chemical Formula Y-2:

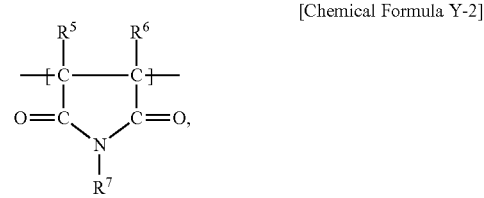

[Chemical Formula Y-2]

wherein in Chemical Formula Y-2: $R^5$ and $R^6$ are each independently selected from hydrogen and a substituted or unsubstituted C1 to C20 alkyl group, and $R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

In one embodiment, in the electrode for a rechargeable lithium battery, the copolymer includes the repeating unit represented by Chemical Formula X and repeating unit represented by Chemical Formula Y-1 in a mole ratio of about 40:60 to about 60:40.

In one embodiment, in the electrode for a rechargeable lithium battery, the copolymer further includes a repeating unit represented by Chemical Formula Z:

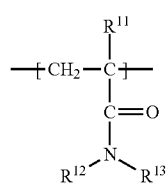

[Chemical Formula Z]

wherein, $R^{11}$ is selected from hydrogen and a substituted or unsubstituted C1 to C20 alkyl group, and $R^{12}$ and $R^{13}$ are independently selected from hydrogen, a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

In one embodiment, in the electrode for a rechargeable lithium battery, the copolymer includes about 5 mol % to about 35 mol % of the repeating unit represented by Chemical Formula X, about 5 mol % to about 35 mol % of the repeating unit represented by Chemical Formula Y-1, and about 30 mol % to about 90 mol % of the repeating unit represented by Chemical Formula Z.

In one embodiment, in the electrode for a rechargeable lithium battery, the copolymer includes about 5 mol % to about 35 mol % of the repeating unit represented by Chemical Formula X, about 5 mol % to about 35 mol % of the repeating unit represented by Chemical Formula Y-1, about 20 mol % to about 89 mol % of the repeating unit represented by Chemical Formula Z, and about 1 mol % to about 10 mol % of repeating units represented by at least one of Chemical Formulas W-1 to W-5:

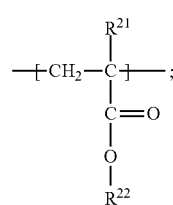

[Chemical Formula W-1]

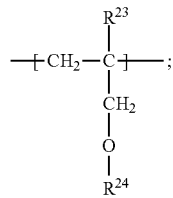

[Chemical Formula W-2]

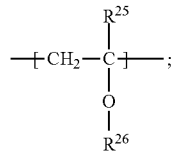

[Chemical Formula W-3]

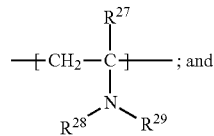

[Chemical Formula W-4]

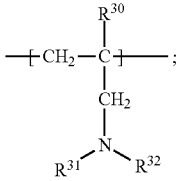

[Chemical Formula W-5]

wherein: $R^{21}$, $R^{23}$, $R^{25}$, $R^{27}$ and $R^{30}$ are each independently selected from hydrogen and a substituted or unsubstituted C1 to C20 alkyl group, $R^{22}$, $R^{24}$, and $R^{26}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, a C1 to C20 alkylamine group, a C1 to C20 alkyl group substituted with an alkoxysilane group, and a C1 to C20 alkyl group substituted with an amine group, $R^{28}$ and $R^{29}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group, $R^{28}$ and $R^{29}$ are linear or are linked as a fused ring, $R^{31}$ and $R^{32}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group, and $R^{31}$ and $R^{32}$ are linear or are linked as a fused ring.

In one embodiment, in the electrode for a rechargeable lithium battery, the binder is included in an amount of 0.01 wt % to 50 wt % by weight based on 100 wt % of the active material layer.

In one embodiment, in the electrode for a rechargeable lithium battery, the active material includes Si, $SiO_x$, a Si—C composite, a Si-Q alloy, graphite, or a combination thereof, and wherein 0<x<2 and Q is an alkali metal, an alkaline-earth metal, a Group 13 to 16 element (excluding Si), a transition element, a rare earth element, or a combination thereof.

In another embodiment, a method of preparing an electrode for a rechargeable lithium battery is provided. The method includes mixing an active material, a solvent, and a binder to prepare an active material composition, coating the active material composition on a current collector, and heat-treating the current collector coated with the active material composition, wherein: the binder includes a copolymer including a repeating unit represented by Chemical Formula X and a repeating unit represented by Chemical Formula Y-1, and has a weight average molecular weight of about 10,000 to about 500,000 before the heat-treating of the current collector coated with the active material composition, and the binder includes a copolymer including a repeating unit represented by Chemical Formula X and a repeating unit represented by Chemical Formula Y-2, and has a weight average molecular weight of about 10,000 to about 500,000, after the heat-treating of the current collector coated with the active material composition,

[Chemical Formula X]

and wherein in Chemical Formula X, $R^1$ to $R^4$ are each independently selected from hydrogen, a substituted or unsubstituted C1 to C20 alkyl group, and a substituted or unsubstituted C6 to C30 aryl group, L is a substituted or unsubstituted C2 to C10 alkenylene group, and n is 0 or 1,

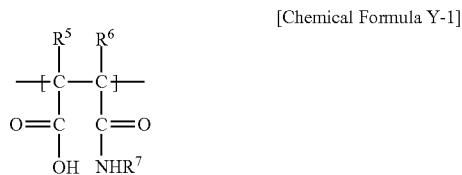

[Chemical Formula Y-1]

and wherein in Chemical Formula Y-1, $R^5$ and $R^6$ are independently selected from hydrogen and a substituted or unsubstituted C1 to C20 alkyl group, and $R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group,

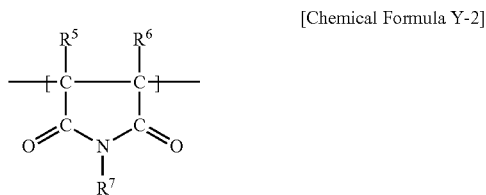

[Chemical Formula Y-2]

and wherein in Chemical Formula Y-2, $R^5$ and $R^6$ are independently selected from hydrogen and a substituted or unsubstituted C1 to C20 alkyl group, and $R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

In one embodiment, the solvent is selected from one or more of water and an alcohol.

In one embodiment, the heat-treating of the current collector coated with the active material composition is performed at about 120° C. to about 300° C.

In one embodiment, a weight ratio of binder after the heat-treating of the current collector coated with the active material composition relative to the binder before the heat-treating of the current collector coated with the active material composition, ranges from about 0.5:1 to about 0.9:1 (weight of the binder after the heat-treating of the current collector:weight of the binder before the heat-treating of the current collector).

In one embodiment, the active material includes Si, $SiO_x$, a Si—C composite, a Si-Q alloy, graphite, or a combination thereof and wherein 0<x<2, and Q is selected from an alkali metal, an alkaline-earth metal, a Group 13 to 16 element (excluding Si), a transition metal element, a rare earth element, or a combination thereof.

In another embodiment, a rechargeable lithium battery is provided. The rechargeable lithium battery includes the electrode a rechargeable lithium battery as described above, a separator; and an electrolyte.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
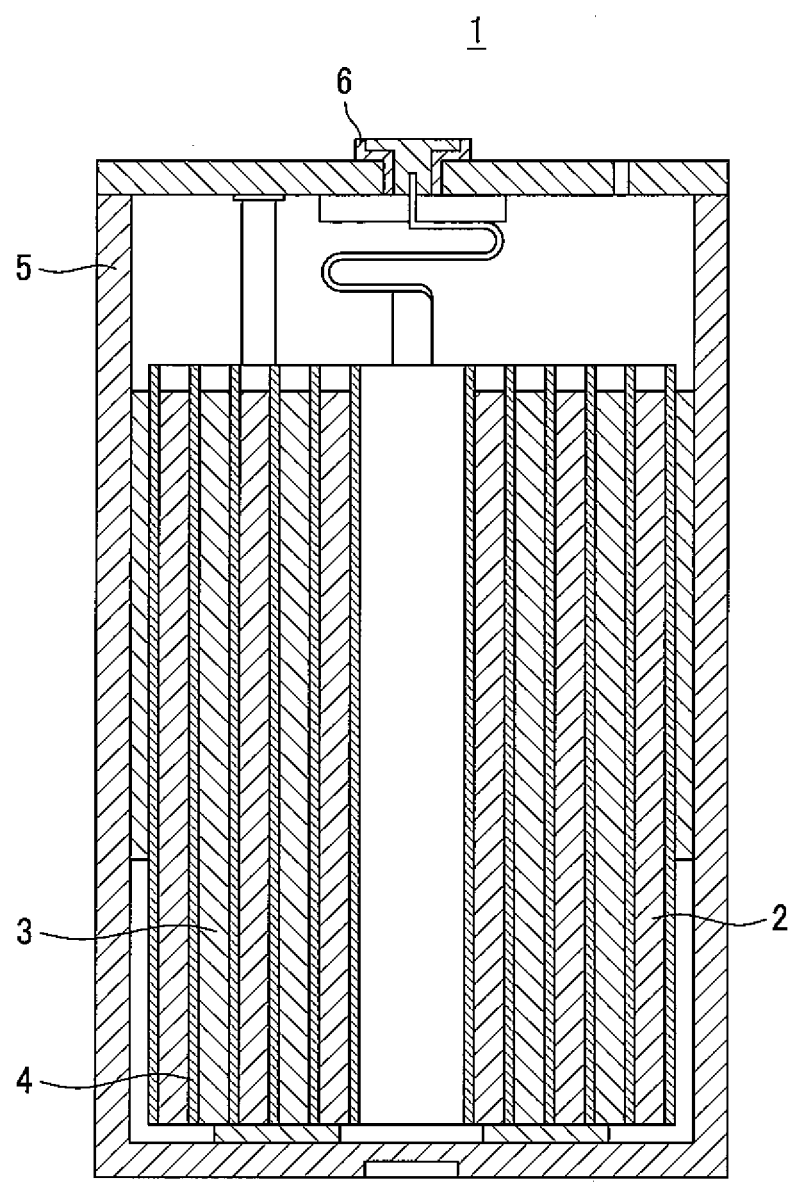
FIG. 1 is a schematic view showing a rechargeable lithium battery according to one embodiment of the present invention.

Embodiments of the present disclosure will hereinafter be described in more detail. However, only certain embodiments are described by way of example, and the present disclosure is not limited thereto.

As used herein, unless a definition is otherwise provided, the term "substituted" refers to substitution of at least one hydrogen with a C1 to C30 alkyl group, a C2 to C30 alkenyl group, a C2 to C30 alkynyl group, a C1 to C10 alkylsilyl group, a C3 to C30 cycloalkyl group, a C6 to C30 aryl group, a C1 to C30 heteroaryl group, a C1 to C10 alkoxy group; a silane group, an alkylsilane group, an alkoxysilane group, an amine group, an alkylamine group, an arylamine group, or a halogen.

As used herein, unless a definition is otherwise provided, the term "hetero" or "hetero atom" refers to one selected from N, O, S, and P.

As used herein, unless a definition is otherwise provided, the term "alkyl group" refers to "a saturated alkyl group" (that is, without any alkenyl group or alkynyl group) or "an unsaturated alkyl group" (that is, including at least one alkenyl group or alkynyl group). The "alkenyl group" refers to a substituent having at least one carbon-carbon double bond, and the "alkynyl group" refers to a substituent having at least one carbon-carbon triple bond. The alkyl group includes a branched alkyl group, a linear alkyl group, or cyclic alkyl group.

The alkyl group includes a C1 to C20 alkyl group, for example, a C1 to C6 lower alkyl group, a C7 to C10 medium-sized alkyl group, or a C11 to C20 higher alkyl group. In another embodiment, the alkyl group includes a C1 to C10 alkyl group.

For example, a C1 to C4 alkyl group having 1 to 4 carbon atoms in an alkyl chain, such as methyl, ethyl, propyl, iso-propyl, n-butyl, iso-butyl, sec-butyl, and t-butyl are included.

Examples of the alkyl group include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

As used herein, unless a definition is otherwise provided, the term "aromatic group" refers to a cyclic substituent in which a p-orbital of each atom in the ring are formed in conjugation. Examples of the aromatic group include an aryl group and a heteroaryl group.

As used herein, unless a definition is otherwise provided, the term "aryl group" refers to a monocyclic or fused ring (e.g., a plurality of rings sharing adjacent pairs of carbon atoms).

As used herein, unless a definition is otherwise provided, the term "heteroaryl group" refers to an aryl group including 1 to 3 hetero atoms selected from the group consisting of N, O, S, and P. When the heteroaryl group is a fused ring, each ring may include 1 to 3 hetero atoms.

As used herein, unless a definition is otherwise provided, the term "copolymerization" includes block copolymerization, random copolymerization, graft copolymerization, or alternating copolymerization, and the term "copolymer" includes a block copolymer, a random copolymer, a graft copolymer, or an alternating copolymer.

In the drawings, features such as the thickness of layers, films, panels, and regions are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Binder for Rechargeable Lithium Battery

A binder for a rechargeable lithium battery according to one embodiment of the present invention includes a copolymer including repeating units represented by the following Chemical Formulas X and Y-1:

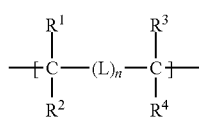

[Chemical Formula X]

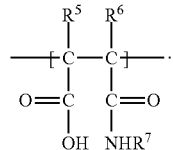

[Chemical Formula Y-1]

In Chemical Formula X, $R^1$ to $R^4$ are each independently selected from hydrogen, a substituted or unsubstituted C1 to C20 alkyl group, and a substituted or unsubstituted C6 to C30 aryl group; L is a substituted or unsubstituted C2 to C10 alkenylene group; and n is 0 or 1.

In Chemical Formula Y-1, $R^5$ and $R^6$ are each independently selected from hydrogen and a substituted or unsubstituted C1 to C20 alkyl group, $R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

$R^7$ may be substituted with at least one functional group selected from a halogen, an amino group, a mercapto group, an ether group, an ester group, a C1 to C20 alkoxy group, a sulfone group, a nitro group, a hydroxy group, a cyclobuene group, a carbonyl group, a carboxyl group, an alkyne group, a urethane group, a vinyl group, a nitrile group, and an epoxy group.

For example, $R^7$ may be selected from a methyl group, an ethyl group, a propyl group, a butyl group, a cyclohexyl group, a monoethanol group, a diethanol group, and the like. In one embodiment, $R^7$ is a methyl group or an ethyl group. In some of these embodiments, the binder for the rechargeable lithium battery dissolves well in water.

In some embodiments, the copolymer is formed by randomly or by alternately copolymerizing the repeating units represented by Chemical Formulas X and Y-1.

In some embodiments, the copolymer has a weight average molecular weight of about 10,000 to about 500,000.

In some embodiments, the copolymer comprises the repeating units represented by Chemical Formula X and Chemical Formula Y-1 in a mole ratio of about 40:60 to about 60:40.

In some embodiments, the binder is used with an organic solvent. In some embodiments, the binder is used with water or an aqueous solvent, for example an aqueous solvent including one or more alcohols, or the like. In other words, the binder may be organic but also, aqueous. In embodiments where the binder is used with an aqueous solvent, the binder may be environmentally-friendly.

In some embodiments, the repeating unit represented by Chemical Formula X is obtained from an unsaturated monomer, such as an ethylene monomer. The repeating unit represented by Chemical Formula Y-1 includes an amic acid group. In some embodiments, the repeating unit represented by Chemical Formula Y-1 is converted into a repeating unit including an imide group by drying and heat-treating a copolymer including the repeating unit represented by Chemical Formula Y-1.

A conventional binder for a rechargeable lithium battery such as a styrene-butadiene rubber (SBR), carboxylmethyl cellulose (CMC), and the like may deteriorate cycle-life of a rechargeable lithium battery. Also, when polyamideimide (PAI) is used as a binder for a rechargeable lithium battery, the binder may decrease initial efficiency of a rechargeable lithium battery and thus may be less environmentally-friendly due to use of an organic solvent, such as N-methylpyrrolidone (NMP), which should not be released into the air.

However, the binder for a rechargeable lithium battery according to embodiments of the present invention is durable and/or suppresses volume expansion of an active material during the charge and discharge and thus, works as a buffer layer. In addition, in some embodiments, the binder allows active material particles to adhere to one another and also allows the active material to adhere to a current collector. Thus in some embodiments, the rechargeable lithium battery including the binder according to embodiments herein described, is stable and has good rate capability and cycle-life characteristics. In addition, the binder, in some embodiments, is used with an aqueous solvent and thus, is environmentally-friendly.

In some embodiments, the copolymer has an interpenetrating polymer network (IPN) formed of a blend of more than two cross-linking polymers or a semi-interpenetrating polymer network (semi-IPN) formed of a blend of a cross-linked polymer and a linear polymer. Such copolymers have a dense and thick structure and can be more durable and/or better suppress expansion of the active material.

In some embodiments, in the copolymer, the repeating units represented by Chemical Formula X and Chemical Formula Y-1 are, respectively, in a mole ratio of about 40:60 to about 60:40, or about 45:55 to about 55:45. In some embodiments, the repeating units represented by Chemical Formulas X and Y-1 are included in the copolymer in approximately a same amount, that is, in about a 50:50 mole ratio. The ratio here refers to a relative mole ratio between repeating units represented by Chemical Formula X and Chemical Formula Y-1 based on the sum of the repeating units represented by Chemical Formula X and Chemical Formula Y-1. In embodiments where the mole ratio is within these ranges, the binder is more aqueous and has better adherence.

In some embodiments, the copolymer has a weight average molecular weight of about 10,000 to about 500,000. In some embodiments, the copolymer has a weight average molecular weight of about 100,000 to about 400,000. In some embodiments, viscosity and adherence of the binder for the rechargeable lithium battery vary with molecular weight of the copolymer. When the aqueous binder has a weight average molecular weight within the disclosed ranges, in some embodiments, ease of preparing the active material composition is improved and adherence of the active material composition to a current collector is improved.

In some embodiments, the repeating unit represented by Chemical Formula X is obtained from styrene, ethylene, isobutylene, or isoprene monomers. In some embodiments, the repeating unit represented by Chemical Formula X is a repeating unit represented by one of the following Chemical Formulas X-1 to X-4 but is not limited thereto:

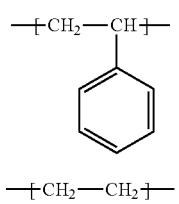

[Chemical Formula X-1]

—(CH₂—CH₂)— [Chemical Formula X-2]

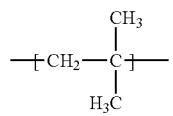

[Chemical Formula X-3]

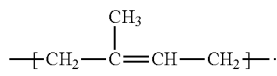

[Chemical Formula X-4]

In particular, in some embodiments, when the binder includes a repeating unit represented by Chemical Formula X-1 derived from styrene, the binder can effectively suppress volume expansion of an active material and/or be more durable.

In some embodiments, the binder for the rechargeable lithium battery is prepared, for example, by reacting a substituted or unsubstituted ethylene monomer, a substituted or unsubstituted maleic anhydride, and a substituted or unsubstituted amine.

In some embodiments, the copolymer further includes a repeating unit represented by the following Chemical Formula Z:

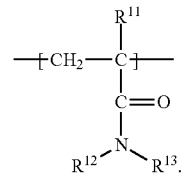

[Chemical Formula Z]

In Chemical Formula Z, $R^{11}$ is selected from hydrogen and a substituted or unsubstituted C1 to C20 alkyl group, $R^{12}$ and $R^{13}$ are each independently selected from hydrogen, a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group. In some embodiments, $R^{12}$ and $R^{13}$ are linked as a fused ring. For example, in some embodiments, in Chemical Formula Z, N, $R^{12}$, and $R^{13}$ are linked to provide a 5-membered ring, a 6-membered ring, a 7-membered ring, or the like.

In some embodiments, $R^{12}$ and $R^{13}$ are independently selected from hydrogen, a methyl group, an ethyl group, an isopropyl group, an N-methylol group, and an N-butoxy group.

The repeating unit represented by Chemical Formula Z is a repeating unit which can be derived from N-substituted or unsubstituted acrylamide. The binder for a rechargeable lithium battery, according to some embodiments, has improved adherence by including the repeating unit represented by Chemical Formula Z.

In some embodiments, the copolymer includes about 5 mol % to about 35 mol % of the repeating unit represented by Chemical Formula X, about 5 mol % to about 35 mol % of the repeating unit represented by Chemical Formula Y-1, and about 30 mol % to about 90 mol % of the repeating unit represented by Chemical Formula Z.

In some embodiments, the copolymer further includes a repeating unit represented by Chemical Formula Z and/or repeating units represented by at least one of the following Chemical Formulas W-1 to W-5:

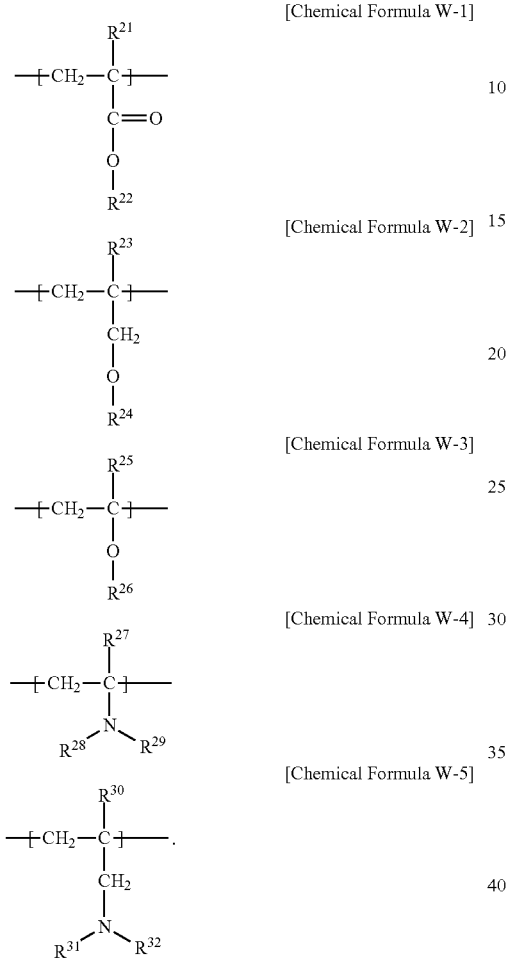

[Chemical Formula W-1]

[Chemical Formula W-2]

[Chemical Formula W-3]

[Chemical Formula W-4]

[Chemical Formula W-5]

In Chemical Formulas W-1 to W-5, $R^{21}$, $R^{23}$, $R^{25}$, $R^{27}$, and $R^{30}$ are each independently selected from hydrogen and a substituted or unsubstituted C1 to C20 alkyl group.

In Chemical Formulas W-1 to W-3, $R^{22}$, $R^{24}$, and $R^{26}$ are each independently selected from hydrogen, a substituted or unsubstituted C1 to C20 alkyl group, a substituted or unsubstituted C2 to C20 alkenyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, a C1 to C20 alkylamine group, a C1 to C20 alkyl group substituted with an alkoxysilane group, and a C1 to C20 alkyl group substituted with an amine group.

By way of example, the C1 to C20 alkyl group substituted with an alkoxysilane group may be an alkoxysilylmethyl group, an alkoxysilylethyl group, an alkoxysilylpropyl group, an alkoxysilylbutyl group, an alkoxysilylpentyl group, or the like. Examples of alkoxy groups include methoxy, ethoxy, propoxy, butoxy, and the like.

In Chemical Formulas W-4 and W-5, $R^{28}$, $R^{29}$, $R^{31}$, and $R^{32}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group, and may include a heteroatom.

In some embodiments, $R^{28}$ and $R^{29}$ are linked as a fused ring. In some embodiments, $R^{31}$ and $R^{32}$ are linked as a fused ring. In some embodiments, in Chemical Formula W-4, N, $R^{28}$, and $R^{29}$ are linked to provide a 5-membered ring, 6-membered ring, 7-membered ring, or the like. In some embodiments, in Chemical Formula W-5, N, $R^{31}$ and $R^{32}$ are linked to provide a 5-membered ring, 6-membered ring, 7-membered ring, or the like.

According to some embodiments, the copolymer has improved adherence by including the repeating units represented by Chemical Formulas W-1 to W-5.

In some embodiments, the copolymer includes about 5 mol % to about 35 mol % of the repeating unit represented by Chemical Formula X, about 5 mol % to about 35 mol % of the repeating unit represented by Chemical Formula Y-1, about 20 mol % to about 89 mol % of the repeating unit represented by Chemical Formula Z, and about 1 mol % to about 10 mol % of at least one of repeating units represented by Chemical Formulas W-1 to W-5.

In some embodiments, the copolymer further includes a repeating unit represented by Chemical Formula Z and/or repeating units represented by at least one of the following Chemical Formulas V-1 to V-3. The following Chemical Formulas V-1 to V-3, are specific examples of the above Chemical Formulas W-1 to W-5. The Chemical Formulas V-1 and V-2 are examples of Chemical Formula W-1, and the Chemical Formula V-3 is an example of Chemical Formula W-4.

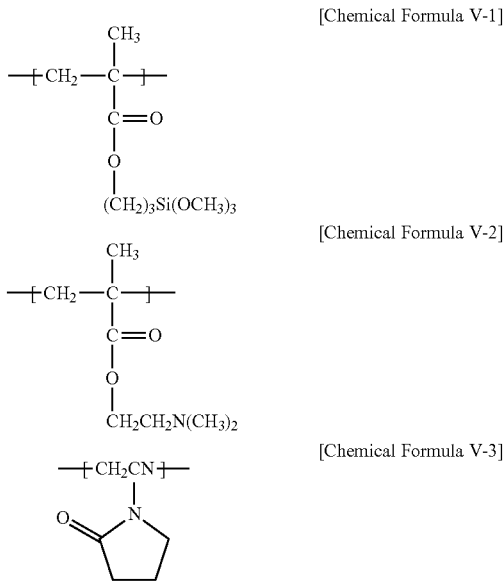

[Chemical Formula V-1]

[Chemical Formula V-2]

[Chemical Formula V-3]

In some embodiments, the copolymer includes about 5 mol % to about 35 mol % of the repeating unit represented by Chemical Formula X, about 5 mol % to about 35 mol % of the repeating unit represented by Chemical Formula Y-1, about 20 mol % to about 89 mol % of the repeating unit represented by Chemical Formula Z, and about 1 mol % to about 10 mol % of at least one of repeating units represented by Chemical Formulas V-1 to V-3.

Electrode for Rechargeable Lithium Battery

According to another embodiment of the present invention, an electrode for a rechargeable lithium battery includes a current collector and an active material layer on one side or both sides of the current collector, wherein the active material layer includes an active material and a binder. The binder includes a copolymer including the repeating units represented by Chemical Formulas X and Y-2. In some embodiments, the copolymer has a weight average molecular weight of about 10,000 to about 500,000 and includes the repeating units represented by Chemical Formula X and Chemical Formula Y-2 in a mole ratio of about 90:10 to about 10:90.

The above Chemical Formula X and descriptions thereof are the same as already described herein (above).

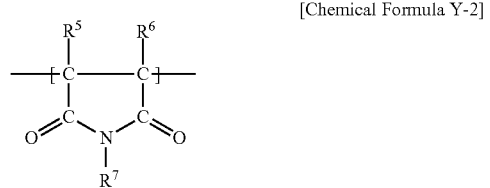

[Chemical Formula Y-2]

In Chemical Formula Y-2, $R^5$ and $R^6$ are independently selected from hydrogen and a substituted or unsubstituted C1 to C20 alkyl group, $R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group. In some embodiments, the copolymer includes the repeating units represented by Chemical Formulas X and Y-2 are present in a mole ratio of about 90:10 to about 10:90.

In some embodiments, $R^7$ is substituted with at least one functional group selected from a halogen, an amino group, a mercapto group, an ether group, an ester group, a C1 to C20 alkoxy group, a sulfone group, a nitro group, a hydroxy group, a cyclobutene group, a carbonyl group, a carboxyl group, a alkyne group, a urethane group, a vinyl group, a nitrile group, and an epoxy group.

In some embodiments, $R^7$ is selected from a methyl group, an ethyl group, a propyl group, a butyl group, a cyclohexyl group, a monoethanol group, a diethanol group, and the like. In one embodiment, $R^7$ is a methyl group or an ethyl group. In some embodiments, when $R^7$ is a methyl group or an ethyl group, the binder dissolves well in water.

In the electrode for a rechargeable lithium battery, the binder includes a copolymer prepared by randomly or alternately copolymerizing the repeating units represented by Chemical Formulas X and Y-2

In some embodiments, the repeating unit represented by Chemical Formula X is a repeating unit obtained from an unsaturated monomer, such as ethylene. The repeating unit represented by Chemical Formula Y-2 includes an imide group and, in some embodiments, is obtained by drying and heat-treating a binder including the repeating unit represented by Chemical Formula Y-1.

In some embodiments, the binder in the electrode for a rechargeable lithium battery is suitable to suppress volume expansion of an active material and/or be more durable during the charge and discharge, and thus can work as a buffer layer. In addition, in some embodiments, the binder allows the active material particles to adhere well to one another and to a current collector. Accordingly, in some embodiments an electrode for a rechargeable lithium battery including the binder is stable and has good rate capability cycle-life characteristics. In addition, in some embodiments, the electrode including the binder is environmentally-friendly.

In some embodiments, the binder in the electrode for a rechargeable lithium battery has an interpenetrating polymer network (IPN) formed of a blend of two or more cross-linking polymers or a semi-interpenetrating polymer network (semi-IPN) formed of a blend of a cross-linking polymer and a linear polymer. According to some embodiments, the binder for a rechargeable lithium battery has a denser and thicker structure and thus is more suitable for suppressing expansion of an active material and/or is more durable with respect to expansion of the active material.

In some embodiments, the copolymer comprises the repeating unit represented by Chemical Formula X and the repeating unit represented by Chemical Formula Y-1, respectively, in a mole ratio of about 40:60 to about 60:40 or about 45:55 to about 55:45.

In some embodiments, the copolymer comprises the repeating units represented by Chemical Formulas X and Y-2 in approximately a same amount, that is, in about a 50:50 mole ratio. The ratio here is a relative mole ratio between the repeating units represented by Chemical Formulas X and Y-2 based on the sum of the repeating units represented by Chemical Formula X and Y-2. According to some embodiments, when a mole ratio is within these ranges, the binder becomes more aqueous (that is, having better solubility in an aqueous solvent) and has better adherence.

In the electrode for the rechargeable lithium battery, the binder, in some embodiments, has a weight average molecular weight of about 10,000 to about 500,000 and in some embodiments, of about 100,000 to about 400,000. In some embodiments, the viscosity and adherence of the binder vary with molecular weight of the copolymer. In some embodiments, when the binder has a weight average molecular weight within the above ranges, workability of the active material composition and adherence of the active material composition to a current collector are improved.

In some embodiments, the repeating unit represented by Chemical Formula X is obtained from styrene, ethylene, isobutylene, or isoprene. In some embodiments, the repeating unit represented by Chemical Formula X is a repeating unit represented by one of Chemical Formulas X-1 to X-4 but is not limited thereto. The Chemical Formulas X-1 to X-4 and descriptions thereof are the same as already described herein (above).

In some embodiments, the copolymer further includes a repeating unit represented by Chemical Formula Z. The Chemical Formula Z and descriptions thereof are the same as already described herein (above).

In some embodiments, the copolymer includes about 5 mol % to about 35 mol % of the repeating unit represented by Chemical Formula X, about 5 mol % to about 35 mol % of the repeating unit represented by Chemical Formula Y-2 and about 30 mol % to about 90 mol % of the repeating unit represented by Chemical Formula Z.

In some embodiments, the copolymer further includes a repeating unit represented by Chemical Formula Z and/or repeating units represented by at least one of the following Chemical Formulas W-1 to W-5. The Chemical Formulas W-1 to W-5 and descriptions thereof are the same as already described herein (above).

In some embodiments, the copolymer includes about 5 mol % to about 35 mol % of the repeating unit represented by Chemical Formula X, about 5 mol % to about 35 mol % of the repeating unit represented by Chemical Formula Y-2, about 20 mol % to about 89 mol % of the repeating unit represented by Chemical Formula Z, and about 1 mol % to about 10 mol % of repeating units represented by at least one of Chemical Formulas W-1 to W-5.

In some embodiments, the copolymer further includes a repeating unit represented by Chemical Formula Z and/or repeating units represented by at least one of the following Chemical Formulas V-1 to V-3. The following Chemical Formulas V-1 to V-3, are specific examples of the above Chemical Formula W-1 to Chemical Formula W-5. The Chemical Formulas V-1 and V-2 are examples of Chemical Formula W-1, and the Chemical Formula V-3 is an example of Chemical Formula W-4. The Chemical Formulas V-1 to V-3 and descriptions thereof are the same as already described herein (above).

In some embodiments, the copolymer includes about 5 mol % to about 35 mol % of the repeating unit represented by Chemical Formula X, about 5 mol % to about 35 mol % of the repeating unit represented by Chemical Formula Y-2, about 20 mol % to about 89 mol % of the repeating unit represented by Chemical Formula Z, and about 1 mol % to about 10 mol % of repeating units represented by at least one of Chemical Formulas V-1 to V-3.

In the electrode for the rechargeable lithium battery, the binder, in some embodiments, is included in an amount of about 0.01 wt % to about 50 wt %, for example, about 1 wt % to about 30 wt %, about 1 wt % to about 20 wt %, about 3 wt % to about 20 wt %, or about 1 wt % to about 10 wt %, based on 100 wt % of the active material layer. In some embodiments, when the binder is included within these ranges, an electrode for a rechargeable lithium battery including the binder is more durable and/or better suppresses volume expansion of an active material, and has sufficient adherence.

In some embodiments, the active material includes Si, $SiO_x$, a Si—C composite, a Si-Q alloy, graphite, or a combination thereof where $0<x<2$, and Q is selected from an alkali metal, an alkaline-earth metal, a Group 13 to 16 element (excluding Si), a transition element, a rare earth element, or a combination thereof. Examples of Q include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, Ni, and combinations thereof. In another embodiment, when a Si-included negative active material such as Si, $SiO_x$, a Si—C composite, a Si-Q alloy, or a combination thereof, is used together with the binder, the effects of using the binder according to the embodiment may be effectively obtained.

When an active material is applied to a rechargeable lithium battery, the rechargeable lithium battery may have high-capacity. However, the active material may expand by about 300% to about 400% during charge and discharge and thus stability or cycle-life characteristics of a rechargeable lithium battery may deteriorate. However, when the active material is used with the binder according to embodiments of the present invention, the binder can suppress expansion of the active material and/or be more durable with respect to the expansion of the active material, and thus can work as a buffer layer. Accordingly, a rechargeable lithium battery including the binder according to some embodiments of the present invention is stable and has good cycle-life characteristic.

On the other hand, when a binder such as styrene-butadiene rubber (SBR), carboxyl methyl cellulose (CMC), and the like is applied to a negative electrode, a negative active material including greater than or equal to about 5 wt % of Si may not provide optimal performance of a rechargeable lithium battery. When the Si is included in an amount of about 3 wt % or about 1.6 wt %, the negative active material may deteriorate cycle-life characteristics of a rechargeable lithium battery. However, including the binder according to some embodiments of the present invention allows for good cycle-life characteristic and efficiency of a rechargeable lithium battery even when Si is included in an amount of greater than or equal to about 5% as well as in smaller amounts.

In some embodiments, the active material layer further includes a conductive material.

In some embodiments, the conductive material improves electrical conductivity of the negative electrode. Any suitable electrically conductive material may be used, except for those which cause a chemical change. Examples of the conductive material include at least one selected from a carbon-based material of natural graphite, artificial graphite, carbon black, acetylene black, ketjen black, a carbon fiber, and the like; a metal-based material such as a metal powder or a metal fiber including copper, nickel, aluminum, silver, and the like; a conductive a polymer such as a polyphenylene derivative.

In some embodiments, the conductive material is used in an amount of about 0.1 parts to about 50 parts by weight, for example, about 0.1 parts to about 30 parts by weight, about 0.1 parts to about 15 parts by weight, or about 0.1 parts to about 10 parts by weight, based on 100 parts by weight of the active material layer.

In some embodiments, the active material layer further includes a thickener. In some embodiments, the thickener controls phase separation of an active material in a slurry state and provides stability of an active material composition.

Exemplary thickeners include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the thickener is included in an amount of more than about 0, and equal to or less than about 10 parts by weight, for example, more than about 0, and equal to or less than about 3 parts by weight based on 100 parts by weight of the active material layer.

In some embodiments, the electrode for a rechargeable lithium battery is a negative electrode. In some embodiments, the active material layer is a negative active material layer. In some embodiments, the active material is a negative active material.

When the binder according to embodiments herein described, is applied together with a negative active material including silicon (Si) to fabricate a negative electrode, the negative electrode have improved performance as already described herein. However, the binder may be applied to a positive electrode as well, or both the positive and the negative electrode without any particular limit.

The current collector may be any suitable current collector, for example, one having high conductivity, except those which cause a chemical change. In some embodiments, the current collector is about 3 μm to about 500 μm thick, but is not limited thereto.

In some embodiments, the current collector applied to a negative electrode is a copper foil, a nickel foil, a stainless steel foil, a titanium foil, a nickel foam, a copper foam, a polymer substrate coated with a conductive metal, or a combination thereof.

In some embodiments, the current collector applied to a positive electrode is a stainless steel, aluminum, nickel, titanium, fired carbon, or aluminum or stainless steel that is surface-treated with carbon, nickel, titanium, silver, or the like.

Method of Preparing of Electrode for Rechargeable Lithium Battery

According to another embodiment of the present invention, a method of manufacturing an electrode for a rechargeable lithium battery includes mixing an active material, a solvent, and a binder to prepare an active material composition, coating the active material composition on a current collector, and heat-treating the current collector coated with the active material composition, that is, the current collector coated with the active material composition is "heat-treated" (herein also referred to as the "heat-treating" or the "heat-treatment"). The binder before the heat-treating includes a copolymer including a repeating unit represented by Chemical Formula X and a repeating unit represented by Chemical Formula Y-1.

The Chemical Formulas X and Y-1 and descriptions thereof are the same as already described herein (above).

In some embodiments, the binder for a rechargeable lithium battery is prepared by reacting a substituted or unsubstituted ethylene monomer, a substituted or unsubstituted maleic anhydride, and a substituted or unsubstituted amine.

According to some embodiments, the heat-treatment converts a repeating unit represented by Chemical Formula Y-1 into a repeating unit represented by Chemical Formula Y-2. The Chemical Formula Y-2 and descriptions thereof are the same as already described above. The repeating unit represented by Chemical Formula Y-2 is a repeating unit including an imide group.

Accordingly, an electrode for a rechargeable lithium battery according to embodiments of the present invention can suppress volume expansion of an active material and/or be more durable during the charge and discharge, and has good adherence among active material particles and/or good adherence of the active material to a current collector, thus providing a rechargeable lithium battery having good stability, rate capability, and cycle-life characteristics.

The solvent includes any suitable aqueous solvent generally used in the art, for example water, alcohols, or combinations thereof and, in some embodiments, water alone. The manufacturing method using the aqueous solvent may be environmentally-friendly.

In some embodiments, the heat-treating of the current collector coated with the active material composition is performed at about 120° C. to about 300° C., for example, about 120° C. to about 250° C., about 120° C. to about 200° C., about 150° C. to about 300° C., about 150° C. to about 250° C., or about 150° C. to about 200° C. In some embodiments, the heat treatment within these temperature ranges converts a repeating unit represented by Chemical Formula Y-1 into a repeating unit represented by Chemical Formula Y-2. In other words, in some embodiments, an amic acid group is converted into an imide group.

Figure 2:
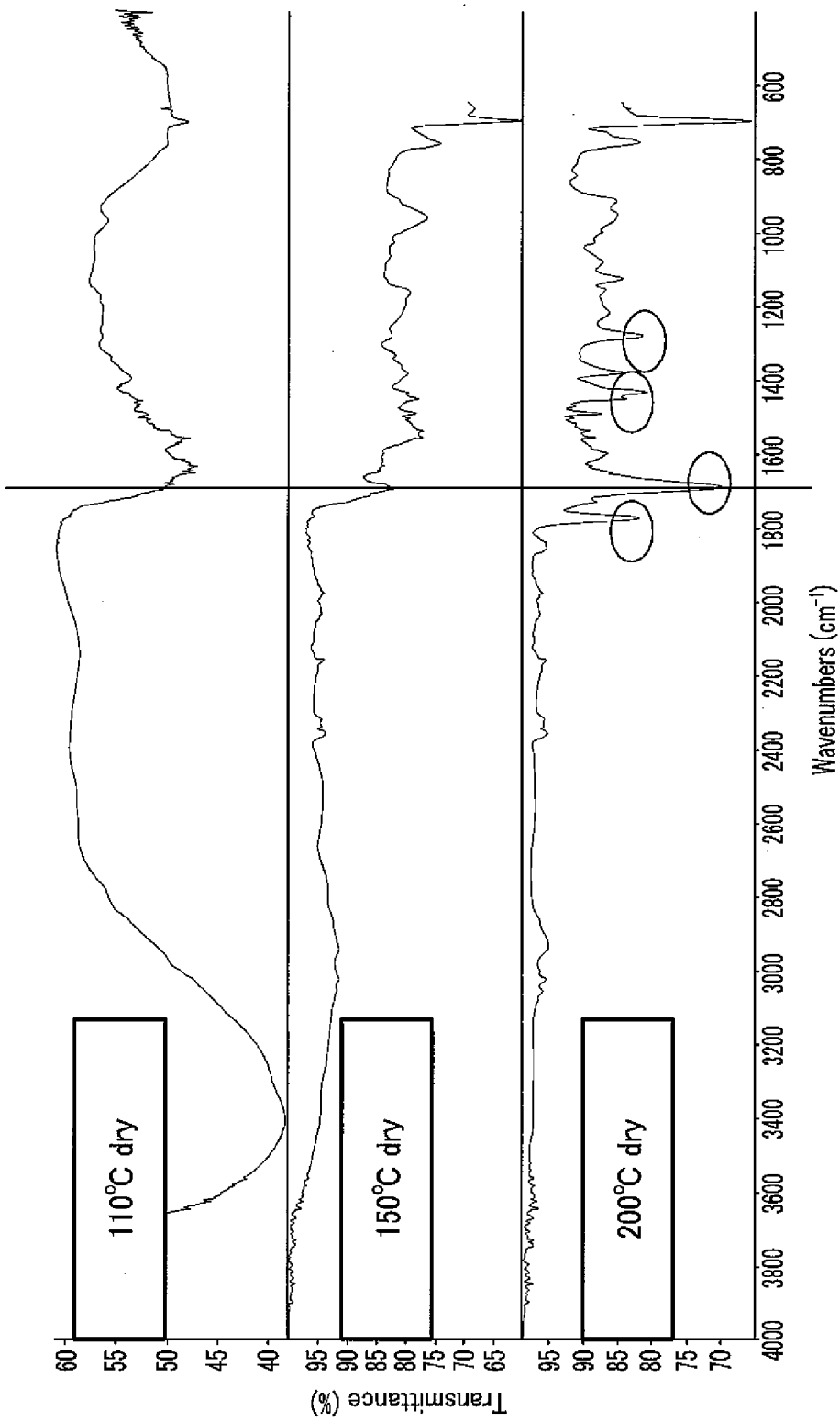
FIG. 2 is an infrared spectroscopy graph (IR) showing binders produced at varying temperatures of heat-treatment.

FIG. 2 provides an infrared spectroscopy graph (IR) of the binder, e.g. styrene-co-maleic anhydride, according one embodiment, with varying temperature of the heat-treating. Referring to FIG. 2, when the binder is heat-treated at 110° C., the binder shows no peak at 1700 $cm^{-1}$, which would correspond to absorption of an imide (that is, an imide is not present according to the IR spectrum). However, when the binder is heat-treated at higher temperatures, a peak at 1700 $cm^{-1}$ (corresponding to absorption of an imide) is clearly observed (that is, an imide is present according to the IR spectrum).

In some embodiments, the heat-treatment is performed for about 10 minutes to about 5 hours, for example, about 30 minutes to about 3 hours or about 30 minutes to about 2 hours, and a repeating unit represented by Chemical Formula Y-1 is converted into a repeating unit represented by Chemical Formula Y-2.

In some embodiments, the heat-treatment is performed in air. In some embodiments, the heat-treatment is performed under an inert gas atmosphere. In some embodiments, the heat-treatment is performed under a vacuum atmosphere.

In some embodiments, during the heat-treatment, the binder loses mass because water molecules are produced when an amic acid group is converted into an imide group, and are evaporated during the heat treatment. Thus, the mass of the binder may decrease.

For example, in some embodiments, the binder has a weight ratio after the heat treatment relative to before the heat treatment, in a range of about 0.5:1 to 0.9:1 (weight of the binder after the heat-treating of the current collector:weight of the binder before the heat-treating of the current collector), for example, about 0.6:1 to 0.9:1 or about 0.7:1 to 0.9:1.

When the binder loses mass through the heat-treatment, the active material relative to the binder has an increased ratio. In other words, in some embodiments, the weight ratio of the active material relative to the binder is increased through the heat-treatment. Accordingly, in some embodiments, the rechargeable lithium battery has an increased capacity.

In some embodiments, the binder has an interpenetrating polymer network (IPN) formed of a blend of more than two cross-linking polymers and a semi-interpenetrating polymer network (semi-IPN) formed of a blend of a cross-linking polymer and a linear polymer. In some of these embodiments, the binder for a rechargeable lithium battery has a denser and thicker structure and thus, can suppress expansion of the active material and/or be more durable with respect the expansion of the active material.

In some embodiments, the copolymer includes repeating units represented by Chemical Formula X and repeating units represented by Chemical Formula Y-1, respectively, in a mole ratio of about 40:60 to about 60:40, for example, about 45:55 to about 55:45. In some embodiments, the repeating units represented by Chemical Formulas X and Y-1 are included in approximately a same amount, that is, in about a 50:50 mole ratio. The ratio here is a relative mole ratio between the repeating units represented by Chemical Formulas X and Y-1 based on the sum of the repeating units represented by Chemical Formulas X and Y-1. In some embodiments, when a mole ratio is within these ranges, the binder becomes more soluble in an aqueous solvent and has better adherence.

In some embodiments, the binder has a weight average molecular weight of about 10,000 to about 500,000, for example, a weight average molecular weight of about 100,000 to about 400,000. In some embodiments, viscosity and adherence of the binder for the rechargeable lithium battery, varies with molecular weight of the copolymer. In some embodiments, when the aqueous binder has a weight average molecular weight within these ranges, workability of the active material composition and adherence to a current collector are improved.

In some embodiments, the repeating unit represented by Chemical Formula X is obtained from styrene, ethylene, isobutylene, or isoprene. That is, in some embodiments, during preparation of the binder, a monomer that provides the repeating unit represented by Chemical Formula X is styrene, ethylene, isobutylene, or isoprene. For example, in some embodiments, the repeating unit represented by Chemical Formula X is a repeating unit represented by one of Chemical Formulas X-1 to X-4, but is not limited thereto. The Chemical Formulas X-1 to X-4 and descriptions thereof are the same as already described herein (above).

In some embodiments, the copolymer further includes a repeating unit represented by Chemical Formula Z. In some embodiments, during preparation of the binder, N-substituted or unsubstituted acrylamide is further added. The Chemical Formula Z and descriptions thereof are the same as already described herein (above).

In some embodiments, the copolymer further includes a repeating unit represented by Chemical Formula Z and/or repeating units represented by at least one of the following Chemical Formulas W-1 to W-5. In some embodiments, during preparation of the binder, a monomer suitable to provide the repeating unit represented by the following Chemical Formulas W-1 to W-5, are further added. The Chemical Formulas W-1 to W-5 and descriptions thereof are the same as already described herein.

In some embodiments, the copolymer further includes a repeating unit represented by Chemical Formula Z and/or repeating units represented by at least one of the following Chemical Formulas V-1 to V-3. The Chemical Formulas V-1 to V-3 are examples of the above Chemical Formulas W-1 to W-5. The Chemical Formulas V-1 and V-2 are specific examples of the Chemical Formula W-1, and Chemical Formula V-3 is a specific example of Chemical Formula W-4. The Chemical Formulas V-1 to V-3 and descriptions thereof are the same as already described herein (above).

In the method of preparing an electrode for a rechargeable lithium battery, the binder, in some embodiments, is included in an amount of about 0.01 wt % to about 50 wt %, for example, about 1 wt % to about 30 wt %, about 1 wt % to about 20 wt %, about 3 wt % to about 20 wt %, or about 1 wt % to about 10 wt %, based on 100 wt % of the active material composition. When the binder is included within these ranges, an electrode for a rechargeable lithium battery fabricated in the preparation according to some embodiments, can suppress expansion of an active material and/or be more durable with respect the expansion of the active material, and has sufficient adherence.

In some embodiments, the active material includes Si, $SiO_x$, a Si—C composite, a Si-Q alloy, graphite, or a combination thereof, where $0<x<2$ and Q is an alkali metal, an alkaline-earth metal, a Group 13 to 16 element (excluding Si), a transition element, a rare earth element, or a combination. Examples of Q include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

An active material may provide a rechargeable lithium battery having high-capacity. However, the active material can expand by about 300% to about 400% during charge and discharge, and thus can deteriorate stability or cycle-life characteristics of a battery. On the contrary, when the active material is used with the binder according to embodiments of the present invention, the binder can in some embodiments, suppress expansion of the active material and/or be more durable with respect the expansion of the active material, and can work as a buffer layer. Accordingly, a rechargeable lithium battery including the binder according embodiments of the present invention is stable and has good cycle-life characteristics.

In the method of preparing an electrode for a rechargeable lithium battery, the current collector is the same as already described herein (above).

Rechargeable Lithium Battery

According to one embodiment of the present invention, a rechargeable lithium battery including an electrode for a rechargeable lithium battery, a separator, and an electrolyte is provided. According to another embodiment of the present invention, a rechargeable lithium battery including the electrode for the rechargeable lithium battery manufactured according to the methods herein described, a separator, and an electrolyte is provided.

In some embodiments, the electrode is a positive electrode. In some embodiments, the electrode is a negative electrode.

FIG. 1 is a schematic view of a structure of a rechargeable lithium battery according to one embodiment of the present invention. As shown in FIG. 1, the rechargeable lithium battery 1 includes a positive electrode 3, a negative electrode 2, and a separator 4 between the positive electrode 3 and negative electrode 2, an electrolyte impregnated therein, a battery case 5 including the positive electrode 3, negative electrode 2, the separator 4, and the electrolyte, and a sealing member 6 sealing the battery case 5.

When the electrode is a positive electrode, the positive electrode, in some embodiments, includes a positive active material, for example a compound (lithiated intercalation compound) capable of intercalating and deintercalating lithium.

Examples of the positive active material include a lithium composite oxide including at least one metal selected from cobalt, manganese, nickel, or a combination thereof, including compounds represented by the following chemical formulas. $Li_aA_{1-b}R_bD_2$ ($0.90 \le a \le 1.8$ and $0 \le b \le 0.5$); $Li_aE_{1-b}R_bO_{2-c}D_c$ ($0.90 \le a \le 1.8$, $0 \le b \le 0.5$ and $0 \le c \le 0.05$); $Li_aE_{2-b}R_bO_{4-c}D_c$ ($0.90 \le a \le 1.8$, $0 \le b \le 0.5$, $0 \le c \le 0.05$); $Li_aNi_{1-b-c}Co_bR_cD_\alpha$ ($0.90 \le a \le 1.8$, $0 \le b \le 0.5$, $0 \le c \le 0.05$ and $0 < \alpha \le 2$); $Li_aNi_{1-b-c}Co_bR_cO_{2-\alpha}Z_\alpha$ ($0.90 \le a \le 1.8$, $0 \le b \le 0.5$, $0 \le c \le 0.05$ and $0 < \alpha < 2$); $Li_aNi_{1-b-c}Co_bR_cO_{2-\alpha}Z_2$ ($0.90 \le a \le 1.8$, $0 \le b \le 0.5$, $0 \le c \le 0.05$ and $0 < \alpha < 2$); $Li_aNi_{1-b-c}Mn_bR_cD_\alpha$ ($0.90 \le a \le 1.8$, $0 \le b \le 0.5$, $0 \le c \le 0.05$ and $0 < \alpha \le 2$); $Li_aNi_{1-b-c}Mn_bR_cO_{2-\alpha}Z_\alpha$ ($0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_2$ ($0.90 \le a \le 1.8$, $0 \le b \le 0.5$, $0 \le c \le 0.05$ and $0 < \alpha < 2$); $Li_aNi_bE_cG_dO_2$ ($0.90 \le a \le 1.8$, $0 \le b \le 0.9$, $0 \le c \le 0.5$ and $0.001 \le d \le 0.1$.); $Li_aNi_bCo_cMn_dG_eO_2$ ($0.90 \le a \le 1.8$, $0 \le b \le 0.9$, $0 \le c \le 0.5$, $0 \le d \le 0.5$ and $0.001 \le e \le 0.1$.); $Li_aNiG_bO_2$ ($0.90 \le a \le 1.8$ and $0.001 \le b \le 0.1$.); $Li_aCoG_bO_2$ ($0.90 \le a \le 1.8$ and $0.001 \le b \le 0.1$.); $Li_aMnG_bO_2$ ($0.90 \le a \le 1.8$ and $0.001 \le b \le 0.1$.); $Li_aMn_2G_bO_4$ ($0.90 \le a \le 1.8$ and $0.001 \le b \le 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, the positive electrode further includes a binder or a conductive material. Examples of the binder include the binder according to embodiments herein described, or, for example, polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but is not limited thereto.

The conductive material and current collector are the same as already described here (above).

In some embodiments, the positive electrode is manufactured by a method including mixing an active material, a binder, or the like in a solvent to prepare an active material composition, and coating the active material composition on a current collector. Electrode manufacturing methods are known, and thus are not described in more detail in the present disclosure.

In some embodiments, the separator includes any suitable materials commonly used in a conventional lithium battery, for example any separator suitable for separating a negative electrode from a positive electrode and providing a transportation passage of lithium ions. In other words, the separator in some embodiments has a low resistance to ion transport and suitable impregnation of the electrolyte. For example, the separator may be selected from glass fiber, polyester, TEFLON (polytetrafluoroethylene), polyethylene, polypropylene, polytetrafluoroethylene (PTFE), or a combination thereof. The separator may have a form of a non-woven fabric or a woven fabric. For example, for the lithium ion battery, a polyolefin-based polymer separator such as polyethylene, polypropylene or the like. In some embodiments, a coated separator including a ceramic component or a polymer material is be used to provide heat resistance and/or mechanical strength. The separator can be a single layer or multi-layered structure.

According to some embodiments, the electrolyte includes a non-aqueous organic solvent and a lithium salt.

The non-aqueous organic solvent serves as a medium for transmitting ions taking part in the electrochemical reaction of a battery.

Non-limiting examples of the non-aqueous organic solvent include a carbonate-based, ester-based, ether-based, ketone-based, alcohol-based, or aprotic solvent. Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Non-limiting examples of the ester-based solvent include methyl acetate, ethyl acetate, n-propyl acetate, 1,1-dimethylethyl acetate, methylpropinonate, ethylpropinonate, γ-butyrolactone, decanolide, valerolactone, mevalonolactone, caprolactone, and the like. Non-limiting examples of the ether-based solvent include dibutyl ether, tetraglyme, diglyme, dimethoxyethane, 2-methyltetrahydrofuran, tetrahydrofuran and the like. Non-limiting examples of the ketone-based solvent include cyclohexanone and the like. Non-limiting examples of the alcohol-based solvent include ethanol, isopropyl alcohol, and the like. Non-limiting examples of the aprotic solvent include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, a mixture ratio can be controlled in accordance with desirable performance of a battery.

In some embodiments, the carbonate-based solvent includes a mixture of a cyclic carbonate and a linear carbonate. In some embodiments, the cyclic carbonate and the linear carbonate are mixed together in a volume ratio of about 1:1 to about 1:9, which in some embodiments, enhances performance of an electrolyte.

In addition, in some embodiments, the non-aqueous organic solvent is prepared by further adding an aromatic hydrocarbon-based organic solvent to the carbonate-based solvent. In some embodiments, the carbonate-based solvent and the aromatic hydrocarbon-based organic solvent are mixed together in a volume ratio of about 1:1 to about 30:1.

Examples of the aromatic hydrocarbon-based organic solvent include an aromatic hydrocarbon-based compound represented by the following Chemical Formula A:

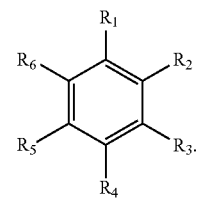

[Chemical Formula A]

In Chemical Formula A, $R_1$ to $R_6$ are independently hydrogen, a halogen, a C1 to C10 alkyl group, a C1 to C10 haloalkyl group, or a combination thereof.

Further examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

In some embodiments, the non-aqueous electrolyte further includes vinylene carbonate or an ethylene carbonate-based compound represented by the following Chemical Formula B in order to improve cycle-life of a battery:

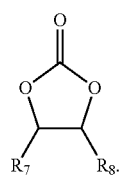

[Chemical Formula B]

In Chemical Formula B, $R_7$ and $R_8$ are independently selected from hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

An amount of the vinylene carbonate or the ethylene carbonate-based compound for improving cycle life may be adjusted within a suitable range.

The lithium salt is dissolved in the non-aqueous solvent and supplies lithium ions in a rechargeable lithium battery, operating the rechargeable lithium battery and improving lithium ion transfer between positive and negative electrodes. In some embodiments, the lithium salt includes at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are non-zero natural numbers), LiCl, LiI, $LiB(C_2O_4)_2$ (lithium bis(oxalato) borate, LiBOB), or a combination thereof. In some embodiments, the lithium salt is used in a concentration of about 0.1 M to about 2.0M. When the lithium salt is included within the above concentration range, in some embodiments, electrolyte performance and lithium ion mobility is improved due to optimal electrolyte conductivity and viscosity.

The following examples illustrate the present invention in more detail. These examples, however, should not in any sense be interpreted as limiting the scope of the present invention.

Preparation of Binder

PREPARATION EXAMPLE 1

390 g of deionized water and 30 g of styrene-co-maleic anhydride were put in a 2 L reaction container having a heater, a cooler, and an agitator, and 11.5 g of a 40% methylamine aqueous solution was slowly added thereto at room temperature. The mixture was agitated for 10 minutes. The reaction container was heated up to 80° C. under a nitrogen atmosphere and maintained for 3 hours. Next, a solution prepared by dissolving 0.125 g of ammonium persulfate in 10 g of deionized water was added to the reactant, and the resulting mixture was maintained for 20 minutes. Then, an aqueous solution prepared by adding 63 g of acrylamide and 7 g of N,N-dimethylaminoethyl methacrylate to 180 g of deionized water was added thereto in a dropwise fashion for 2 hours. The obtained mixture was maintained and reacted for one hour, and cooled down to lower than or equal to 40° C., obtaining a copolymer having a solid of 15.0%, pH of 6.1, and viscosity of 1,600 cps, that is, a binder.

The copolymer includes repeating units represented by the following Chemical Formulas X-1, Y-11, Z-11, and V-2 in a mole ratio of 6.0:6.0:83.8:4.2. The copolymer has a weight average molecular weight of 350,000.

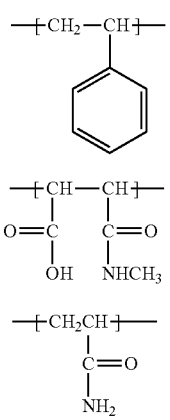

[Chemical Formula X-1]

[Chemical Formula Y-11]

[Chemical Formula Z-11]

-continued

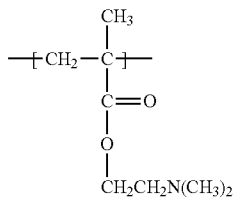

[Chemical Formula V-2]

PREPARATION EXAMPLE 2

A binder was prepared according to the same method as Preparation Example 1 except that isobutylene-co-maleic anhydride was used instead of the styrene-co-maleic anhydride in the Preparation Example 1.

The binder included repeating units represented by the following Chemical Formulas X-3, Y-11, Z-11, and V-2 in a mole ratio of 7.2:7.2:81.4:4.2. The binder had a weight average molecular weight of 350,000.

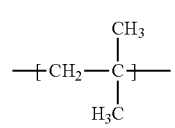

[Chemical Formula X-3]

Manufacture of Rechargeable Lithium Battery Cell

EXAMPLE 1

30 wt % of "SiNW16 (Nanosys, Inc., U.S.A)" was mixed with 70 wt % of graphite "MAGV4" as a negative active material, and the mixture, 10 parts by weight of the binder according to Preparation Example 1 and water were added thereto, thus preparing slurry. Herein, the negative active material, SiNW16, had a structure of growing a silicon nano wire on graphite and included 16 wt % of Si. In addition, the graphite, MAGV4, included artificial graphite (Showa Denko Co., Ltd.) and natural graphite (Mitsubishi Inc.) in a weight ratio of 60:40.

The slurry was coated on a copper foil and dried at 110° C. to evaporate water therein and then, compressed, fabricating a 56 μm-thick negative electrode. The negative electrode was vacuum-dried and heat-treated at 200° C. for 1 hour to convert the repeating unit represented by Chemical Formula Y-11 into a repeating unit represented by the following Chemical Formula Y-21. In other words, an amic acid repeating unit was converted into an imide repeating unit.

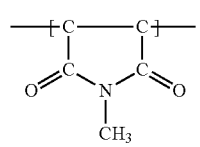

[Chemical Formula Y-21]

FIG. 2 provides an infrared spectroscopy analysis graph at the bottom showing the negative electrode. Referring to FIG. 2, the negative electrode had a strong peak in an imide absorption region of 1700 $cm^{-1}$. Accordingly, the synthesis of an imide repeating unit in an aqueous system was identified.

The negative electrode was cut to be a 16 mm disk-shaped electrode. Then, the resulting negative electrode, a lithium metal as a counter electrode, a polypropylene separator, and an electrolyte solution prepared by mixing ethylene carbonate (EC):diethyl carbonate (DEC):fluoro ethylene carbonate (FEC) in a ratio of 5:70:25 and adding $LiPF_6$ in a concentration of 1.5 mol/L thereto, fabricating a rechargeable lithium battery cell.

EXAMPLE 2

A rechargeable lithium battery cell was fabricated according to the same method as Example 1 except that natural graphite "MC08" (Mitsubishi Inc.) was used instead of "MAGV4" in the negative electrode.

EXAMPLE 3

A rechargeable lithium battery cell was fabricated according to the same method as Example 1 except that artificial graphite "SD13" (Showa Denko Co., Ltd.) was used instead of the graphite "MAGV4" in the negative electrode.

EXAMPLE 4

A rechargeable lithium battery cell was fabricated according to the same method as Example 1 except that "STN" (Si:Ti:Ni=68:16:16) was used instead of the "SiNW16" as a negative active material.

EXAMPLE 5

A rechargeable lithium battery cell was fabricated according to the same method as Example 4 except that natural graphite "MC08" (Mitsubishi Inc.) was used instead of the graphite "MAGV4" in the negative electrode.

EXAMPLE 6

A rechargeable lithium battery cell was fabricated according to the same method as Example 4 except that artificial graphite "SD13" (Showa Denko Co., Ltd.) was used instead of the graphite "MAGV4" in the negative electrode.

EXAMPLES 7 to 12

Rechargeable lithium battery cells were fabricated according to the same method as Examples 1 to 6 except that the binder according to Preparation Example 2 was used.

In the negative electrodes according to Examples 1 to 12, a weight ratio of binder after the heat-treating of the current collector coated with the active material composition relative to the binder before the heat-treating of the current collector coated with the active material composition, ranges from about 0.85:1.

COMPARATIVE EXAMPLE 1

A rechargeable lithium battery cell was fabricated according to the same method as Example 1 except that a polyamideimide (PAI) binder was used in the negative electrode.

COMPARATIVE EXAMPLE 2

A rechargeable lithium battery cell was fabricated according to the same method as Example 1 except that 5 wt % of a styrene-butadiene rubber (SBR) and 5 wt % of carboxylmethyl cellulose (CMC) were used as a binder in the negative electrode.

COMPARATIVE EXAMPLE 3

A rechargeable lithium battery cell was fabricated according to the same method as Example 4 except that a polyamideimide (PAI) was used as a binder in the negative electrode.

COMPARATIVE EXAMPLE 4

A rechargeable lithium battery cell was fabricated according to the same method as Example 4 except that 5 wt % of a styrene-butadiene rubber (SBR) and 5 wt % of carboxylmethyl cellulose (CMC) were used as a binder in the negative electrode.

EXPERIMENTAL EXAMPLES

The rechargeable lithium battery cells according to Examples 1 to 12 and Comparative Examples 1 to 4 were evaluated regarding capacity characteristic, cycle-life characteristic, initial efficiency, and adherence. The results as well as composition of each negative active material and binder are provided in the following Table 1.

TABLE 1

| | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| Active material (wt %) | SiNW16 | 27 | 27 | 27 | | | | 27 | 27 | | |
| | STN | | | | 27 | 27 | 27 | | | 27 | 27 |
| graphite | MAGV4 | 63 | | | 63 | | | 63 | 63 | 63 | 63 |
| | MC08 | | 63 | | | 63 | | | | | |
| | SD13 | | | 63 | | | 63 | | | | |
| Binder (parts by weight) | Preparation Example 1 | 10 | 10 | 10 | 10 | 10 | 10 | | | | |
| | PAI | | | | | | | 10 | | 10 | |
| | SBR | | | | | | | | 5 | | 5 |
| | CMC | | | | | | | | 5 | | 5 |
| Discharge capacity (mAh/g) | | 507 | 495 | 502 | 517 | 521 | 516 | 491 | — | 508 | — |
| Retention capacity (%) @ 50 cycle | | 83 | 81 | 86 | 84 | 86 | 88 | 57 | — | 70 | — |

TABLE 1-continued

|  |  | Examples | | | | | | Comparative Examples | | | |
|---|---|---|---|---|---|---|---|---|---|---|---|
|  |  | 1 | 2 | 3 | 4 | 5 | 6 | 1 | 2 | 3 | 4 |
| Initial efficiency (%) |  | 89 | 89 | 89 | 89 | 88 | 90 | 78 | — | 76 | — |
| Adherence (gf/mm) |  | 2.3 | 1.8 | 1.5 | 6.3 | 6.6 | 7.3 | 1.1 | — | 6.1 | — |

TABLE 2

|  |  | Example | | | | | |
|---|---|---|---|---|---|---|---|
|  |  | 7 | 8 | 9 | 10 | 11 | 12 |
| Active material (wt %) | SiNW16 | 30 | 30 | 30 |  |  |  |
|  | STN |  |  |  | 30 | 30 | 30 |
| graphite | MAGV4 | 70 |  |  | 70 |  |  |
|  | MC08 |  | 70 |  |  | 70 |  |
|  | SD13 |  |  | 70 |  |  | 70 |
| Binder (wt %) | Preparation Example 2 PAI SBR CMC | 10 | 10 | 10 | 10 | 10 | 10 |
| Discharge capacity (mAh/g) |  | 508 | 498 | 512 | 522 | 525 | 518 |
| Retention capacity (%) @ 50 cycle |  | 82 | 80 | 85 | 88 | 87 | 88 |
| Initial efficiency (%) |  | 90 | 89 | 89 | 91 | 90 | 91 |
| Adherence (gf/mm) |  | 3.4 | 2.8 | 3.0 | 6.9 | 7.1 | 7.5 |

Experimental Example 1

Capacity Characteristic

The rechargeable lithium battery cells according to Examples 1 to 12 and Comparative Examples 1 to 4 were charged and discharged at 0.1 C in a voltage range of 1.5V to 0.01V and discharge capacity was measured. The results are provided in Table 1.

Referring to Tables 1 and 2, the rechargeable lithium battery cells according to Comparative Examples 2 and 4 had discharge capacity near to 0, that is, had almost no battery performance. On the other hand, the rechargeable lithium battery cells according to Examples 1 to 12 had a discharge capacity ranging from 495 to 521 mAh/g.

Experimental Example 2

Cycle-Life Characteristic

In the rechargeable lithium battery cells according to Examples 1 to 12 and Comparative Examples 1 to 4, a capacity ratio at 50th cycle related to 1st cycle under a condition of 1 C was measured. The results are provided in Tables 1 and 2.

Referring to Tables 1 and 2, the rechargeable lithium battery cells according to Comparative Example 2 and 4 had capacity retention near to almost 0, and the ones according to Comparative Examples 1 and 3 also had capacity retention of less than or equal to 70%. On the other hand, the rechargeable lithium battery cells according to Examples 1 to 12 maintained capacity retention of greater than or equal to 80% and thus, no sharp capacity decrease. In other words, the rechargeable lithium battery cells had excellent cycle-life characteristic.

Experimental Example 3

Initial Efficiency

The rechargeable lithium battery cells according to Examples 1 to 12 and Comparative Examples 1 to 4 were charged and discharged at 0.1 C and charge and discharge capacities were measured. Additionally, a ratio of the discharge capacity to the charge capacity was calculated. The results are provided in Tables 1 and 2.

Referring to Tables 1 and 2, the rechargeable lithium battery cells according to Comparative Examples 2 and 4 had initial efficiency near to almost 0, and the rechargeable lithium battery cells according to Comparative Examples 1 and 3 also had initial efficiency of less than or equal to 78%. On the other hand, the rechargeable lithium battery cells according to Examples 1 to 12 had efficiency of greater than or equal to 88%, that is, excellent initial efficiency.

Experimental Example 4

Adherence

The heat-treated negative electrodes according to Examples 1 to 12 and Comparative Examples 1 to 4 were fabricated into 10 mm×25 mm-sized samples and adherence was measured by respectively fixing the samples on a glass plate, holding one end with a jig, and then, pulling up the samples to 15 mm at a speed of 100 mm/min in a peeling-off method. The results are provided in Tables 1 and 2.

Referring to Tables 1 and 2, the negative electrode according to Comparative Example 1 had adherence of 1.1 gf/mm, while the one of Comparative Example 2 had adherence near to almost 0. On the other hand, the negative electrodes according to Examples 1 to 3 and 7 to 9 had adherence ranging from 1.5 to 3.4 gf/mm.

In addition, the negative electrode of Comparative Example 3 had adherence of 6.1 gf/mm, and the negative electrode of Comparative Example 4 had adherence near to almost 0. On the other hand, the negative electrodes of Examples 4 to 6 and 10 to 12 had adherence ranging from 6.3 to 7.5 gf/mm. Accordingly, the embodiments of the present invention all had excellent adherence compared with Comparative Examples.

While this invention has been described in connection with certain exemplary embodiments, it is to be understood that the invention is not limited to the disclosed embodiments, but, on the contrary, is intended to cover various modifications and equivalent arrangements included within the spirit and scope of the present disclosure and appended claims. Therefore, the aforementioned embodiments should be understood to be exemplary and not intended to be limiting this disclosure in any way.

What is claimed is:

1. A binder for a rechargeable lithium battery, comprising
   a copolymer including a repeating unit represented by Chemical Formula X and a repeating unit represented by Chemical Formula Y-1, and having a weight average molecular weight of about 10,000 to about 500,000:

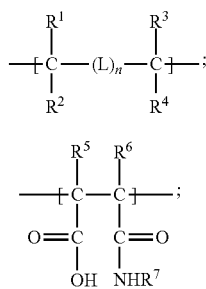

[Chemical Formula X]

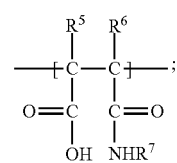

[Chemical Formula Y-1]

wherein in Chemical Formula X:
$R^1$ to $R^4$ are each independently selected from hydrogen, a substituted or unsubstituted C1 to C20 alkyl group, and a substituted or unsubstituted C6 to C30 aryl group,
L is a substituted or unsubstituted C2 to C10 alkenylene group, and
n is 0 or 1,
and wherein in Chemical Formula Y-1:
$R^5$ and $R^6$ are each independently selected from hydrogen and a substituted or unsubstituted C1 to C20 alkyl group, and
$R^7$ is selected from an unsubstituted C7 to C20 alkyl group; a substituted or unsubstituted C2 to C10 alkenyl group; a substituted or unsubstituted C2 to C10 alkynyl group; a substituted or unsubstituted C1 to C10 alkoxy group; a substituted or unsubstituted C3 to C10 cycloalkyl group; an unsubstituted C6 to C30 aryl group; a substituted or unsubstituted C1 to C30 heteroaryl group; a C1 to C20 alkyl group substituted with a C2 to C30 alkenyl group, a C2 to C30 alkynl group, a C1 to C10 alkylsilyl group, a C3 to C30 cycloalkyl group, a C6 to C30 aryl group, a C1 to C30 heteroaryl group, a C1 to C10 alkoxy group, a silane group, an alkylsilane group, an alkoxysilane group, or a halogen; and a C6 to C30 aryl group substituted with a C1 to C30 alkyl group, a C2 to C30 alkenyl group, a C2 to C30 alkynyl group, a C1 to C10 alkylsilyl group, a C3 to C30 cycloalkyl group, a C6 to C30 aryl group, a C1 to C30 heteroaryl group, a C1 to C10 alkoxy group, a silane group, an alkylsilane group, an alkoxysilane group, an amine group, an alkylamine group, an arylamine group, or a halogen.

2. The binder for a rechargeable lithium battery of claim 1, wherein the copolymer comprises the repeating unit represented by Chemical Formula X and the repeating unit represented by Chemical Formula Y-1 in a mole ratio of about 40:60 to about 60:40.

3. The binder for a rechargeable lithium battery of claim 1, wherein the binder is aqueous.

4. The binder for a rechargeable lithium battery of claim 1, wherein the copolymer further comprises a repeating unit represented by Chemical Formula Z:

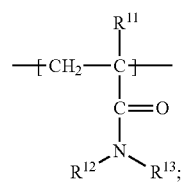

[Chemical Formula Z]

wherein in Chemical Formula Z:
$R^{11}$ is selected from hydrogen and a substituted or unsubstituted C1 to C20 alkyl group, and $R^{12}$ and $R^{13}$ are independently selected from hydrogen, a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group.

5. A binder for a rechargeable lithium battery, comprising a copolymer including a repeating unit represented by Chemical Formula X, and a repeating unit represented by Chemical Formula Y-1, and having a weight average molecular weight of about 10,000 to about 500,000:

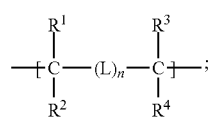

[Chemical Formula X]

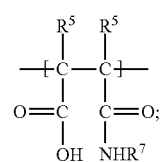

[Chemical Formula Y-1]

wherein in Chemical Formula X:
$R^1$ to $R^4$ are each independently selected from hydrogen, a substituted or unsubstituted C1 to C20 alkyl group, and a substituted or unsubstituted C6 to C30 aryl group,
L is a substituted or unsubstituted C2 to C10 alkenylene group, and
n is 0 or 1;
wherein in Chemical Formula Y-1:
$R^5$ and $R^6$ are each independently selected from hydrogen and a substituted or unsubstituted C1 to C20 alkyl group, and
$R^7$ is selected from an unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group;
wherein the copolymer further comprises a repeating unit represented by Chemical Formula Z:

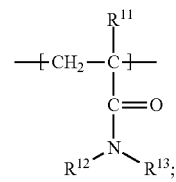

[Chemical Formula Z]

wherein in Chemical Formula Z:
$R^{11}$ is selected from hydrogen and a substituted or unsubstituted C1 to C20 alkyl group, and $R^{12}$ and $R^{13}$ are independently selected from hydrogen, a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group;

wherein the copolymer comprises:
about 5 mol % to about 35 mol % of the repeating unit represented by Chemical Formula X,
about 5 mol % to about 35 mol % of the repeating unit represented by Chemical Formula Y-1, and
about 30 mol % to about 90 mol % of the repeating unit represented by Chemical Formula Z.

6. The binder for a rechargeable lithium battery of claim 4, wherein the copolymer further comprises repeating units represented by at least one of the following Chemical Formulas W-1 to W-5:

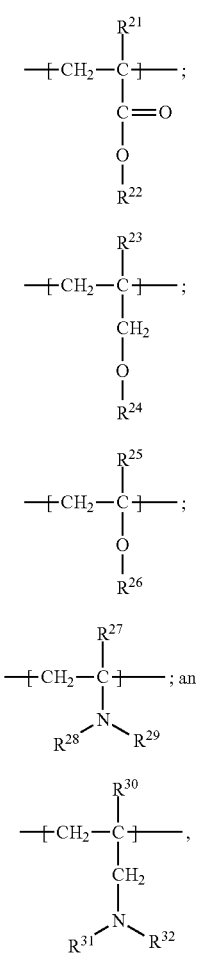

wherein:
$R^{21}$, $R^{23}$, $R^{25}$, $R^{27}$, and $R^{30}$ are each independently selected from hydrogen and a substituted or unsubstituted C1 to C20 alkyl group;
$R^{22}$, $R^{24}$, and $R^{26}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, a C1 to C20 alkylamine group, a C1 to C20 alkyl group substituted with an alkoxysilane group, and a C1 to C20 alkyl group substituted with an amine group;

$R^{28}$ and $R^{29}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group;
$R^{28}$ and $R^{29}$ are each linear or are linked as a fused ring;
$R^{31}$ and $R^{32}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group; and
$R^{31}$ and $R^{32}$ are each linear or are linked as a fused ring.

7. A binder for a rechargeable lithium battery, comprising a copolymer including a repeating unit represented by Chemical Formula X, and a repeating unit represented by Chemical Formula Y-1, and having a weight average molecular weight of about 10,000 to about 500,000:

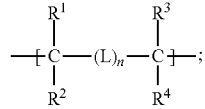

[Chemical Formula X]

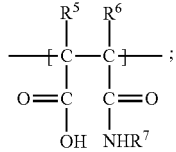

[Chemical Formula Y-1]

wherein in Chemical Formula X:
$R^1$ to $R^4$ are each independently selected from hydrogen, a substituted or unsubstituted C1 to C20 alkyl group, and a substituted or unsubstituted C6 to C30 aryl group,
L is a substituted or unsubstituted C2 to C10 alkenylene group, and
n is 0 or 1;
wherein in Chemical Formula Y-1:
$R^5$ and $R^6$ are each independently selected from hydrogen and a substituted or unsubstituted C1 to C20 alkyl group, and
$R^7$ is selected from a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group;

wherein the copolymer further comprises a repeating unit represented by Chemical Formula Z and repeating units represented by at least one of Chemical Formulas W-1 to W-5:

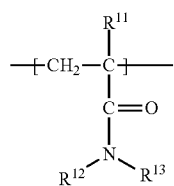

[Chemical Formula Z]

wherein in Chemical Formula Z:

$R^{11}$ is selected from hydrogen and a substituted or unsubstituted C1 to C20 alkyl group, and $R^{12}$ and $R^{13}$ are independently selected from hydrogen, a substituted or unsubstituted C1 to C20 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, and a substituted or unsubstituted C1 to C30 heteroaryl group;

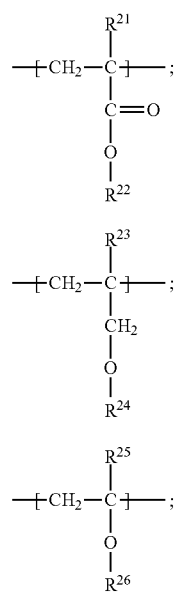

[Chemical Formula W-1]

[Chemical Formula W-2]

[Chemical Formula W-3]

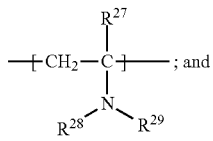

[Chemical Formula W-4]

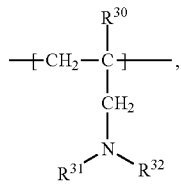

[Chemical Formula W-5]

wherein in Chemical Formulas W-1 to W-5:

$R^{21}$, $R^{23}$, $R^{25}$, $R^{27}$, and $R^{30}$ are each independently selected from hydrogen and a substituted or unsubstituted C1 to C20 alkyl group;

$R^{22}$, $R^{24}$, and $R^{26}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, a C1 to C20 alkylamine group, a C1 to C20 alkyl group substituted with an alkoxysilane group, and a C1 to C20 alkyl group substituted with an amine group;

$R^{28}$ and $R^{29}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group;

$R^{28}$ and $R^{29}$ are each linear or are linked as a fused ring;

$R^{31}$ and $R^{32}$ are each independently selected from hydrogen, a substituted or unsubstituted C1 to C20 alkyl group, a substituted or unsubstituted C2 to C20 alkenyl group, a substituted or unsubstituted C2 to C20 alkynyl group, a C3 to C8 cycloalkyl group, a substituted or unsubstituted C6 to C30 aryl group, a substituted or unsubstituted C1 to C30 heteroaryl group, a silane group, a C1 to C20 alkylsilane group, a C1 to C20 alkoxysilane group, and a C2 to C20 carbonyl group; and $R^{31}$ and $R^{32}$ are each linear or are linked as a fused ring;

wherein the copolymer comprises:

about 5 mol % to about 35 mol % of the repeating unit represented by Chemical Formula X, about 5 mol % to about 35 mol % of the repeating unit represented by Chemical Formula Y-1, about 20 mol % to about 89 mol % of the repeating unit represented by Chemical Formula Z, and about 1 mol % to about 10 mol % of at least one of repeating units represented by Chemical Formulas W-1 to W-5.

* * * * *